3,334,156
GRAFT POLYMERS OF VINYL CHLORIDE ONTO RUBBERY CROSSLINKED ACRYLATE BACKBONES

John W. Calentine, Akron, and Francis J. Maurer and Willem J. Van Essen, Tallmadge, Ohio, assignors to The General Tire & Rubber Company, a corporation of Ohio
No Drawing. Filed Apr. 22, 1964, Ser. No. 361,905
20 Claims. (Cl. 260—884)

This invention relates to improvements in plasticizing polyvinyl chloride. More particularly, it concerns the formation of internally plasticized vinyl chloride polymer by grafting vinyl chloride, or vinyl chloride with a minor percentage of comonomer, onto substrates formed of solid flexible polymers that have been cross-linked to a controlled degree with small amounts of polyfunctional copolymerizable monomers.

Vinyl chloride polymers are one of the oldest and most used type of commercially important thermoplastic resins because they combine low cost with good strength and many other desirable properties. Polyvinyl chloride, however, itself is normally hard and rigid, and, for most uses, it is necessary to plasticize the polymer with rather large percentages of plasticizer.

The general method of plasticizing vinyl chloride polymers involves homogeneously mixing the polymer with some high boiling organic compound which is compatible with the polymer, e.g., dioctyl phthalate. Many theories have been expounded as to the mechanism of plasticization, but, regardless of the theoretical explanation, the admixture of vinyl chloride polymers with plasticizers changes the hard, rigid resins into thermoplastic solids which are flexible and workable with extrusion, molding and calendering machines. A wide range of strength, flexibility, elongation and other properties can be obtained by varying the proportion of the plasticizer relative to the vinyl chloride polymer.

A plasticizer of the type just described which is mixed with vinyl chloride polymer after its formation is referred to in the trade as an "external" plasticizer. Such plasticizers possess certain disadvantages, some of which are well known even to the casual user of products made from externally plasticized polyvinyl chloride. These include odor, fogging, exudation, stiffening and similar undesirable changes which occur in sheets, films, molded articles or the like, formed of the plasticized polymers during the useful life of the article. All of these disadvantages are associated either with the limited volatility of the plasticizer itself or with its tendency to "bleed" or migrate to the surface of the thermoplastic composition as it ages. The volatility, although limited, of the plasticizer results in the odor with which any housewife is acquainted that has unfolded a shower curtain, table covering or other item made from plasticized polyvinyl chloride sheet or film. Many housewives are also familiar with the marring or damage that can be caused to the varnished surface of furniture by contact with some article made of plasticized polyvinyl chloride which exhibits any pronounced tendency for the plasticizer to "bleed."

In view of the disadvantages associated with external plasticized vinyl chloride plastics, attempts have been made to eliminate these problems by so-called "internal" plasticization of vinyl chloride polymers. Thus, instead of mixing a separate liquid or solid high boiling organic compound with the preformed polymer, attempts have been made to obtain the same flexibility, strength and elongation characteristics by grafting the vinyl chloride polymer onto some other polymer material so as to form an integral molecular connection between the vinyl chloride polymer and a softening or plasticizing polymer. The idea here is to tie together the plasticizer and the vinyl chloride polymer by some molecular connection which will prevent the plasticizer portion of the thermoplastic mass from bleeding or migrating to the surface of the shaped article with the plasticizer component, at the same time, being of such relatively low volatility that the thermoplastic mass will be substantially odorless.

The internal plasticization of vinyl chloride polymers can be accomplished in broadly two separate ways. First, the vinyl chloride polymer may be formed in some suitable fashion, such as emulsion or suspension polymerization, and then a less rigid type of polymer material can be grafted onto the preformed vinyl chloride polymer by polymerization of a suitable monomer or monomer mixture in the presence of the preformed vinyl chloride polymer.

In the second method, the more flexible modifying polymer is first prepared to create a so-called "backbone" for a graft polymerization and vinyl chloride is then polymerized onto this preformed modifying or plasticizing polymer.

The general idea of the internally plasticizing vinyl chloride polymers by graft polymerization is widely disclosed both in the technical and patent literature. The general procedure of grafting other polymers onto preformed vinyl chloride polymers or copolymers is disclosed, for example, in U.S. 2,746,944, 2,879,567, 2,996,469 and 2,996,470. The reverse procedure, in which the modifying backbone polymer is first formed to which vinyl chloride is then grafted is disclosed, for example, in U.S. 2,816,087, 2,843,562, 2,947,719 and 3,019,208.

The general concept of internal graft plasticization of polyvinyl chloride has been attractive because it appeared that this might be the way to solve the disadvantages associated with external plasticization. However, practical utilization of the idea has presented additional critical problems. Obviously, internal plasticization, in order to be commercially practical, should not greatly increase the cost of the thermoplastic composition. Also, to be competitive with the externally plasticized product, the internally plasticized material must possess comparable strength and other physical properties and be capable of being fabricated on available equipment and according to established procedures with which workers in the industry are acquainted.

Internal plasticization of polyvinyl chloride with graft polymers has not proved the cure-all for the plasticizer problem as many had hoped. Thus, internally plasticized compositions have generally not been able to be worked satisfactorily on standard calendering and other fabricating equipment. Also, they generally have not provided the desired combination of physical properties attainable wth the externally plasticized compositions, e.g., the internally plasticized materials frequently suffer from low abrasion resistance, poor light stability, low temperature accommodation or the like.

A principal object of this invention is to provide improvements in the plasticization of vinyl chloride polymers to eliminate the disadvantages associated with externally plasticized polyvinyl chloride polymers while retaining the good characteristics of these prior materials. Further objects include:

(1) The provision of improved forms of plasticized polyvinyl chloride polymer which are free from tendency of any component of the polymer composition to bleed or migrate to the surface during aging and use of the thermoplastic material.

(2) The provision of improved internally plasticized vinyl chloride polymers which may be processed on standard calendering equipment at normal operating conditions providing a so-called "fluid bank" and making possible the calendering of sheets with smooth surfaces.

(3) The provision of new methods for internally plasticizing vinyl chloride polymers which can be accomplished at relatively low cost with good consistency of results and ease of reproduction of desired properties.

(4) The provision of new methods for eliminating tendency of polyvinyl chloride polymers to have portions of their compositions extracted through contact with soapy water or other agents which normally extract and cause deterioration of prior known externally plasticized polyvinyl chloride compositions.

(5) The provision of new methods for forming vinyl chloride polymer compositions which are substantially free of volatility and odor problems associated with externally plasticized vinyl chloride polymer compositions.

(6) The provision of new forms of internally plasticized vinyl chloride polymer compositions possessing a good combination of the following properties:

(a) good low temperature characteristics,
(b) high ultra-violet light stability,
(c) low creep tendencies,
(d) little or no whitening, fogging or hazing, or other indications of phase separation as a result of stretching or other mechanical working of the composition, and
(e) good resistance to soapy water and generally high extraction resistance.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished according to the present invention by formation of internally plasticized polyvinyl chloride polymer by graft polymerization of monomeric vinyl chloride onto preformed polymer of a monoethylenically unsaturated monomer cross-linked by copolymerization with a minor amount of a polyfunctional copolymerizable cross-linking agent as hereinafter further defined and in the presence of a polymerization modifier as hereinafter defined.

By way of introduction to a more detailed discussion of the invention, a preferred internally plasticized composition in accordance with the invention would be made by first forming an emulsion copolymer comprising 95–98% butylacrylate and 2–5% ethylene glycol dimethacrylate in the presence of 0.1 to 2% of a mercaptan polymerization modifier and then graft polymerizing in equal parts by weight monomeric vinyl chloride onto the resulting acrylic ester copolymer while the copolymer particles are still in the form of an aqueous emulsion.

The success of the present invention is due in part to the discovery that internally plasticized polyvinyl chloride polymers of critically improved properties, as compared with related materials previously known, can be formed provided that the initial "backbone" flexible polymers are cross-linked to a controlled extent by use of specific proportions of cross-linking agents and the proportion of vinyl chloride material graft polymerized onto such cross-linked backbone copolymers are controlled within certain limits. For example, if an internally plasticized polyvinyl chloride is prepared by graft polymerization of 50 parts of vinyl chloride onto 50 parts of preformed polybutylacrylate, the resulting internally plasticized polymer has, among other disadvantages, poor tear strength and poor processing properties. Poor processing is characterized by the inability of the polymer to form a fluid bank on a calender at any useable calendering temperature and sheets calendered from such polymer under any commercially feasible calendering conditions have a rough surface. In contrast, an internally plasticized vinyl chloride polymer of the preferred type of this invention, not only combines good flex fatigue and low temperature properties plus very low extraction and low migration characteristics, but also exhibits relatively good tear strength and processing properties, i.e., the polymer may be calendered at temperatures of 120°–180° C. with a relatively fluid bank yielding calendered sheets of relatively smooth surface.

This invention is also dependent on the discovery that the controlled cross-linking must be combined with the action of polymer modifying agents to control the molecular weight of addition polymerization monomers, e.g., alkyl mercaptans and haloalkanes, in conjunction with the cross-linking agents to create the initial backbone copolymers having an inherent viscosity (I.V. as measured in tetrahydrofuran at 25° C. at a concentration of 0.3 gram per 100 ml. of solvent) between about 0.2 and 3.0 and advantageously between 0.6 and 1.2. This control of the initial copolymer material is combined with polymerization conditions during the graft polymerization step to form a final internally plasticized vinyl chloride polymer having an inherent viscosity (I.V.) between about 0.4 to 1.5, and advantageously between about 0.7 and 1.1.

In addition, the success of the invention is dependent upon the discovery that certain cross-linking agents provide unique results.

The preferred monoethylenically unsaturated monomer materials for use in forming the backbone copolymers are acrylic-type esters of the formula:

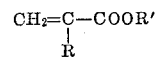

wherein

R is a monovalent radical selected from the group consisting of hydrogen and 1 to 4 carbon atom alkyl, and
R′ is a monovalent radical selected from the group consisting of 2 to 15 carbon atom alkyl where R is hydrogen and 5 to 18 carbon atom alkyl when R is alkyl.

The initial flexible polymer formation can be accomplished using individual esters of the specified type or mixtures thereof, e.g., mixtures of various alcohol esters of acrylic and methacrylic acid obtained as commerical products or desired combinations of the esters.

In additon, various combination of these acrylic-type esters with other monoethylenically unsaturated copolymerizable materials may be employed, e.g., mixtures of the alkyl esters of the specified formula with styrene, methyl methacrylate, vinyl acetate, acrylonitrile and comparable copolymerizable materials. Advantageously, such mixtures will comprise 80 to 95% by weight of the acrylic-type esters of the specified formula and up to 20%, e.g., 5–20%, of the other copolymerizable material although up to 50% of the latter material may be employed if such monomer is capable of giving a flexible homopolymer having about a 100% minimum elongation, e.g., vinyl stearate and the $C_3$–$C_{18}$ alkanol esters of maleic, furamic and itaconic acids, e.g., dibutyl maleate. Such percentages are based on the backbone monomer charge.

Advantageously the cross-linking copolymerizable materials for use in preparing the initial "backbone" flexible polymers of the invention are the acrylic-type polyesters having the formula:

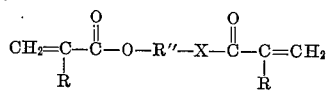

wherein

R is hydrogen or 1 to 4 carbon atom alkyl,
R'' is an alkylene radical containing 1 to 5 carbon atoms, and
X is either the radical —O— or a radical —O(CH$_2$—R''—O)$_n$— wherein $n$ is a positive integer from 1 to 10.

In addition, acrylate ester monomers having a polymerization functionality greater than two are encompassed by the invention as cross-linking agents, e.g., acrylic acid and methacrylic acid esters of glycerol, hexanetriol, trimethylol propane and pentaerythritol.

Mixtures of these esters may be used, e.g., commercial products containing mixtures of alkylene glycol diacrylates.

Other cross-linking agents may be used in forming the backbone polymers although the acrylic-type polyesters just mentioned have been found generally to provide the best combination of strength, stability and fabrication properties in the final internally plasticized vinyl chloride polymer. Additional cross-linking agents broadly encompassed by the invention include (1) divinyl monocyclic arylenes, e.g., divinyl benzene and divinyl toluene; (2) vinyl esters of acrylic type acids, e.g., vinyl acrylate and vinyl alpha-propyl acrylate; (3) allyl and methallyl alpha-ethylene monocarboxylates, e.g., allyl acrylate, methallyl acrylate and allyl methacrylate; (4) diallyl polycarboxylates, e.g., diallyl phthalate, diallyl terephthalate, diallyl itaconate, diallyl fumarate, diallyl oxalate, dially sebacate, 2,4,6-tri (allylamino)-1,3,5-triazine and diallyl 1,2-naphitaconate, diallyl fumarate, diallyl oxalate, diallyl sebacate, materials and mixtures with the preferred acrylic-type polyesters.

The cross-linking copolymerizable monomer material used with the monoethylenically unsaturated monomer in forming the backbone flexible copolymer should be controlled within a relatively narrow limit. Thus, it has been discovered that the monomer mixture used in forming the flexible backbone polymer should contain for each 100 parts of the mixture between about 95 to 99.75 parts of the polymerizable monoethylenically unsaturated material and between about 0.25 to 5 parts of the cross-linking polyunsaturated monomer material. In addition to these two essential components, the monomer mixture will comprise about 0.1 to 5 parts per 100 parts of mixture of a polymer modifying agent such as the alkyl mercaptans containing 4 to 30 carbon atoms.

The first stage polymerization is preferably carried out to high conversions, i.e., conversions of 95% or higher of monomers to polymer, though conversions as low as 85–90% may be employed. The conversion of monomer in the grafting step is carried out to the extent necessary to give the desired ratio of graft polymer to backbone polymer. Such ratio can be 50 to 200 parts of vinyl chloride or other graft monomer mixture to each 100 parts of the backbone copolymer. It is advantageous to employ 70 to 100 parts of vinyl chloride or vinyl chloride mixture as graft monomer to each 100 parts of backbone copolymer. It is preferred to conduct the polymerizations with the monomers initially dispersed as discrete particles in aqueous polymerization systems. Such dispersions may be stable emulsions, i.e., dispersions of such small disperse phase particle size that no phase separation occurs even over long storage periods of the dispersion or aqueous suspensions in which the particle size of the disperse phase is so large that the suspensions must be kept in substantial state of constant agitation to prevent phase separation. The emulsion type polymerization is most advantageously employed.

It is advantageous to conduct both the polymerizations with an aqueous dispersion system and without separation of the initially formed backbone flexible polymer from its aqueous dispersion. In carrying out the methods of the invention using this preferred type operation, the vinyl chloride material is added to the emulsion or suspension of the preformed flexible copolymer all at once and/or in increments, the resulting mixture is stirred or agitated sufficiently to ensure homogeneous distribution of the vinyl chloride material throughout the aqueous dispersion substantially uniformly contacting the individual disperse particles of preformed polymer with monomeric vinyl chloride material. The monomeric vinyl chloride has a certain solvent action upon the preformed flexible copolymer creating a unique polymer structure as the graft polymerization of the vinyl chloride monomer proceeds.

Various catalysts known to the art as useful in catalyzing addition polymerizations, i.e., polymerizations of the vinyl-type, may be employed. These include water-soluble free-radical precursor catalysts such as hydrogen peroxide, hydrogen peroxide-urea complexes, potassium persulfate, sodium peroxide or the like. The water-soluble catalyst which accordingly dissolves or concentrates in the aqueous phase when the emulsion or aqueous suspension polymerizations are employed, has been found to produce the most desirable combination of properties in the final internal plasticized polyvinyl chloride polymers. However, organic-soluble peroxides and other organic-soluble free-radical catalysts may be employed which will concentrate or appear primarily as a component of the disperse phase in the emulsion or suspension polymerizations. Such oil-soluble catalysts include the organic peroxides such as benzoyl peroxide, t-butyl hydroperoxide, methyl ethyl ketone peroxide and lauroyl peroxide and azo compounds, such as azo-bis-isobutyronitrile.

The second stage polymerization in which vinyl chloride material is grafted onto the preformed flexible copolymer is advantageously carried out using vinyl chloride per se as the monomeric material. However, mixtures of vinyl chloride with other copolymerizable vinyl and vinylidene esters, acrylic-type esters or the like may be employed. Examples of mixtures contemplated for use include vinyl chloride with up to 20% of other copolymerizable material, e.g., vinylidene chloride, vinyl acetate, 1 to 4 carbon alkyl acrylates or methacrylates, vinyl stearate, and comparable monoethylenically unsaturated copolymerizable materials.

The conditions employed in the initial flexible copolymer formation and in the graft polymerization step affect the final properties of the internally plasticized vinyl chloride polymer. It has been found that the best combination of properties in the final plasticized polymer are obtained if the polymerization of the initial backbone polymer is accomplished at the polymerization temperature of about 35 to 75° C. in conjunction with suitable amount of catalyst within the range of about 0.1 to 2% by weight of the total monomer mixture to effect a total polymerization of the monomer material within 1 to 10 hours. Similarly, the best results are obtained if the graft polymerization is conducted at a polymerization temperature between about 35 to 75° C. so that the polymerization is completed within about 8 to 24 hours. In this second graft polymerization step, no additional catalyst need be added, but it has been found advantageous to add about 0.1 to 2% additional catalyst to the reaction mixture along with the charge of vinyl chloride material.

EXAMPLES

A more complete understanding of the unique procedures and improved products of this invention may be had by reference to the following reports of details and data concerning operations in accordance with the invention. In these examples, all parts and percentages are by weight unless otherwise specified.

Example 1

The following materials were charged into an autoclave equipped with external heating jacket and a propeller-type stirrer:

| | Parts |
|---|---|
| Butyl acrylate | 98 |
| 1,3-butylene glycol dimethacrylate | 2 |
| Potassium persulfate | 0.2 |
| Tertiary dodecyl mercaptan | 0.3 |
| Water (deonized) | 360 |
| Potassium stearate | 4 |

The autoclave was purged with nitrogen, sealed and then the contents were heated to 50° C. for 5 hours with constant agitation.

At the end of this first polymerization step, the following additional materials were charged into the autoclave:

| | Parts |
|---|---|
| Vinyl chloride | 75 |
| Potassium persulfate | 0.15 |
| Water (deionized) | 40 |

After addition of these materials, the contents were heated to 50° C. for 14 hours with constant gentle agitation. The resulting graft polymer was coagulated from the latex by addition of methanol, recovered by filtration from the supernatant liquor and dried. The conversion of monomers to polymer was over 95%. The inherent viscosity of the polymer measured in tetrahydrofuran solution was 0.86. The graft polymer was soft, non-tacky, very nearly water-clear, passed 250,000 in a flex test, had good light stability and passed −30° F. level in the Masland impact test.

Other runs made without the 1,3-butylene glycol dimethacrylate proved that the graft polymers made from backbone polymer having this cross-linking agent are unique in their ability to graft much higher amounts of vinyl chloride without loss of flex fatigue or good low temperature properties.

In still other runs conducted in similar manner, commercially available monomers were used in place of the chemically pure reagents without any appreciable change in the final polymer. Also in other runs, aqueous calcium chloride solution was used in place of methanol to coagulate the latex. The heat stability of the methanol coagulated polymer was found to be better than that coagulated with calcium chloride.

The graft polymer was processed into thin sheets by first mixing 100 parts of the polymer with 3 parts of epoxy type stabilizer ("Paraplex G–62"), 2 parts of PVC stabilizer ("Vanstay RR") and 0.5 part stearic acid and then sheeting the mixture on a standard plastic calendering machine. The polymer calendered at 160° C. with a fluid bank into 12–15 mil sheets having a generally smooth surface. The calendered sheets were press polished for subsequent testing.

Tests performed according to standard industry test procedures showed the test sheets to have lower tear resistance and slightly greater permanent set than 50–60% dioctyl phthalate plasticized polyvinyl chloride. However, the sheets were better in the following properties as compared to DOP plasticized PVC:

(1) low temperature properties
(2) light stability
(3) creep resistance
(4) fogging properties
(5) extraction resistance and migration
(6) activated carbon volatility.

Example 2

Using the general procedure described in Example 1, a series of polymerizations and subsequent graft polymer testings were carried out on the following different combinations of monomers:

| | Monomer Combination | Parts | Percent |
|---|---|---|---|
| A | Butyl acrylate | 100 | (1) |
| | Diethylene glycol dimethacrylate | 2 | 57 |
| | Vinyl chloride | 75 | 43 |
| B | Butyl acrylate [2] | 100 | 50 |
| | Vinyl chloride | 100 | 50 |
| C | Butyl acrylate | 100 | (3) |
| | Diethylene glycol dimethacrylate | 2 | 50 |
| | Vinyl chloride | 102 | 50 |

[1] First two monomers formed the prepolymer backbone.
[2] First monomer alone formed the prepolymer backbone.
[3] First two items formed the prepolymer backbone.

The figures under the column "percent" represent the weight percentage of prepolymer and vinyl chloride in the final graft polymer.

The resulting graft polymers were calendered into sheets 12–15 mils in thickness at the highest calendering temperature at which smooth surface sheets could be formed. Test samples of these sheets were subjected to physical testing using industry standard test procedures and the data reported in Table I below were obtained.

TABLE I

| Polymer | Tensile, p.s.i. | Tear, #/in. | Processing Temperature, ° C. | Masland Impact | Cold Flow | Flex Limit |
|---|---|---|---|---|---|---|
| A | 1,290 | 70 | 160–175 | −20 | 106 | 400 |
| B | 1,200 | 64 | Below 95 | −10 | 200 | 100 |
| C | 1,750 | 67 | 160–175 | −20 | 150 | 300 |

Data under "Masland Impact" are the lowest temperature limit in ° F. at which the sample under examination will pass the test (the lower the temperature, the better the material for this test). Data under "Cold Flow" gives the percent elongation of a sample strip at 20° C. under 250 p.s.i. load for 19 hours, and under "Flex Limit" the number of flexes (×1000) before failure of the sample.

Example 3

Using the general procedure of Example 1, the following monomer combinations are used to prepare graft polymers identified with the test number as indicated in Table II.

TABLE II

| Test No. | Backbone Polymer Formed of— | | | Graft Monomer | Modifying Agent |
|---|---|---|---|---|---|
| | A | B | C | | |
| 1 | BA-98 | EGDM-2 | None | VC-75 | TDM-0.3 |
| 2 | BA-98 | DBV-2 | None | VC-75 | TDM-0.3 |
| 3 | BA-98 | AM-2 | None | VC-75 | TDM-0.3 |
| 4 | BA-95 | DVB-2 | MMA-3 | VC-100 | CTC-2 |
| 5 | EHA-80 | EGDM-2 | MMA-18 | VC-80 | CTC-5 |
| 6 | EA-80 | DVB-3 | LA-17 | VC-60 | TDM-2 |
| 7 | BA-80 | EGDM-5 | LA-15 | VC-100 | TDM-0.5 |
| 8 | BA-98 | DVB-2 | None | VC-75 | CTC-2 |
| 9 | BA-80 | EGDM-5 | VS-15 | VC-100 | CTC-3 |
| 10 | EA-80 | EGDM-3 | VAC-17 | VC-100 | TDM-0.3 |
| 11 | BA-80 | EGDM-2 | VCN-18 | VC-75 | TDM-0.3 |
| 12 | BA-100 | None | None | VC-100 | None |

In this table, the numbers following the letters indicate the parts of the material and the letter abbreviations designate the following monomers:

AM — Allyl methacrylate.
BA — Butyl acrylate.
CTC — Carbon tetrachloride.
DVB — Divinyl benzene.
EA — Ethyl acrylate.
EGDM — Ethylene glycol dimethacrylate.
EHA — 2-ethyl hexyl acrylate.
LA — Lauryl acrylate.
MMA — Methyl methacrylate.
S — Styrene.
TDM — Tertiary dodecyl mercaptan.

VAC ———————— Vinyl acetate.
VC ————————— Vinyl chloride.
VCN ———————— Acrylonitrile.
VS ————————— Vinyl stearate.

The resulting materials Nos. 1-12 are calendered into sheets 20 mils in thickness and subjected to tests along with similar sheets made of standard dioctyl phthalate plasticized polyvinyl chloride. This latter material, along with test run No. 12, are control runs for comparison test purposes. All samples 1-11 possess a more satisfactory combination of properties than sample 12. When compared to the DOP plasticized standard, Samples 1-11 in addition have the best combination of results in test for (a) activated carbon volatility, (b) mineral extraction, (c) ivory soap extraction, (d) migration to rubber and migration to polystyrene and show as good or better water resistance than the control samples.

As previously stated, preparations of both the elastic backbone polymer and the final graft polymer are advantageously conducted in emulsion systems. Satisfactory emulsions may comprise between about 150 to 1000 parts by weight of water per 100 parts by weight of the monomer mixture used to form the backbone polymer and the resulting emulsion is advantageously used, without change in water quantity, for the final graft polymerization by simply adding all of the vinyl chloride or vinyl chloride monomer mixture to the backbone polymer emulsion. Preferably the amount of vinyl chloride or vinyl chloride monomer containing mixture that will be added to the emulsion will be 50 to 200 parts for each 100 parts of backbone polymer.

In forming the emulsions, any of the emulsifying agents known to be useful in the art of emulsion polymerization of vinyl monomers may be used, preferably in an amount between about 0.5 and 6% and especially 1-4% by weight of monomers contained in the emulsion. Examples of useable emulsifying agents include $C_{12}$ to $C_{20}$ fatty acid soaps, e.g., sodium oleate, ammonium soap of tallow acids, alkanol amine soaps of coconut fatty acids, etc.; alkali metal salts of alkyl acid sulfates, e.g., sodium lauryl sulfate; alkylaryl sulfonates, e.g., sodium isobutyl naphthalene sulfonate; polyalkylene glycol fatty acid esters, e.g. amyl benzyl polyethylene glycol and sulfonated ester, e.g., alkylphenoxy polyethylene glycol ether sulfonate.

The polymerizations, and especially the first polymerization in which the backbone polymer is formed, will be conducted with a polymerization modifying agent present in the monomer mixture in an amount between about 0.1 to 5 parts by weight per 100 parts of total monomer mixture. Such agents are also referred to in the technical literature as chain regulator agents. The alkyl and hydroxyalkyl mercaptans containing 2 to 30 carbon atoms are a preferred class of such agents, e.g., tetradecyl mercaptan, dodecyl mercaptan, 2-hydroxyethyl mercaptan, hexyl mercaptan, etc. Also useable are haloalkanes, e.g., carbon tetrachloride, bromotrifluoromethane, dibromodichloroethane and comparable agents which serve to limit the ultimate molecular weight of the polymer chains. The haloalkanes are advantageously used in amount between 0.5 and 5.0 parts per 100 parts of monomer and mercaptans in amount of 0.1 to 2 parts per 100 parts of monomer.

The alkyl esters of acrylic acid with 2 to 12 carbon atom primary and secondary alkanols and the esters of 5 to 15 carbon atom primary and secondary alkanols of methacrylic acid and particularly useful as the major monomer used in forming the backbone polymers, but acrylic-type esters of the formula or other monomers given above are encompassed by the invention. Examples of included monomers, in addition to those previously mentioned, are butyl acrylate, amyl methacrylate, hexyl methacrylate, amyl ethacrylate, ethyl alpha-butyl acrylate, butyl alpha-propylacrylate, dipropyl ether glycol diacrylate, 1,3-butanediol diacrylate, glycerol triacrylate, trimethylol propane triacrylate, pentarythritol tetra-acrylate and similar di-, tri- and tetra-functional type materials and mixtures thereof which may be used as cross-linkers.

The internally plasticized vinyl chloride polymers of this invention may be used for any purpose for which plasticized polyvinyl chloride are known to have utility. Because of the excellent permanent flexibility and good low temperature properties of these graft polymers, they are recommended for use as coatings for woven fabrics designed as a substitute for leather or as coverings for luggage, furniture or the like. The graft polymers, as indicated, may be calendered or extruded into sheets or films and will accept graining, embossing or similar mechanical finishing. The polymers are substantially odorless, have good shelf life, including good light stability, and are free of the hazards associated with exudation or migration of plasticizer as in externally plasticized polyvinyl chloride. In addition, they may be found useful in the form of latices or dispersions in solvents or other fluids for coating, adhesion, binding or other purposes.

We claim:
1. A method of forming flexible internally plasticized vinyl chloride polymer possessing high resistance against extraction and low migration tendency which comprises:
   (A) forming a solid copolymer having an inherent viscosity between 0.2 and 3 from a monomer mixture consisting essentially of the following ingredients per 100 parts of mixture:
      (a) 95 to 99.5 parts of monoethylenically unsaturated polymerizable material,
      (b) 0.5 to 5 parts of cross-linking copolymerizable material, and
      (c) 0.1 to 5 parts of polymer modifying agent, and
   (B) graft polymerizing unto said copolymer to form a graft polymer having an inherent viscosity between about 0.4 and 1.5, between about 50 to 200 parts per hundred parts of said copolymer of monomer material selected from the group consisting of vinyl chloride and mixtures of vinyl chloride with up to 20% by weight of other copolymerizable monoethylenically unsaturated compound,
   (C) said monoethylenically unsaturated polymerizable material being selected from the group consisting of (1) esters of the following formula:

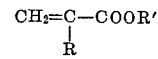

wherein

R is a monovalent radical selected from the group consisting of hydrogen and 1 to 4 carbon atom alkyl, and
   R' is a monovalent radical selected from the group consisting of 2 to 15 carbon atom alkyl when R is hydrogen and 5 to 18 carbon atom alkyl when R is alkyl, (2) mixtures of said esters, and (3) mixtures consisting of 80 to 99% by weight of said esters with 1 to 20% by weight of copolymerizable material selected from the group consisting of styrene, acrylonitrile, 7 to 18 carbon atom alkyl acrylates, 7 to 18 carbon atom alkyl methacrylates and vinyl esters, and
   (D) said cross-linking copolymerizable material being selected from the group consisting of:
      alkylene glycol diacrylates,
      alkylene glycol dimethacrylates,
      divinyl monocyclic arylenes,
      diallyl aryl dicarboxylates, and
      mixtures thereof.

2. A process as claimed in claim 1 wherein said solid copolymer is formed by emulsion polymerization and said graft polymerization is accomplished while said solid copolymer remains in an emulsified condition.

3. A process as claimed in claim 1 wherein a water-soluble catalyst is added to the emulsion along with said group monomer material in carrying out said graft polymerization step B.

4. A process as claimed in claim 1 wherein said group monomer material of Step B is a mixture of about 80–95% vinyl chloride and about 5–20% vinylidene chloride.

5. A process as claimed in claim 1 wherein said graft polymerization Step B is accomplished by adding all said monomer material to an emulsion of said solid copolymer obtained by Step A at one time and then beginning the polymerization of the monomer material upon the emulsified solid copolymer.

6. A process as claimed in claim 1 wherein said polymer modifying agent is a 4 to 30 carbon atom alkyl mercaptan.

7. A method of forming a flexible internally plasticized vinyl chloride polymer possessing high resistance against extraction and low migration tendency which comprises:
(A) forming an aqueous dispersion of a monomer mixture consisting essentially of the following ingredients per 100 parts of mixture:
(a) 95 to 99.5 parts of polymerizable monomer selected from the group consisting of esters and mixtures thereof having the formula:

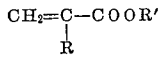

wherein
R is a monovalent radical selected from the group consisting of hydrogen and 1 to 4 carbon atom alkyl, and
R' is a monovalent radical selected from the group consisting of 2 to 15 carbon atom alkyl,
(b) 0.5 to 5 parts of a cross-linking copolymerizable monomer material selected from the group consisting of esters and mixtures thereof having the formula:

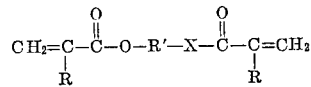

wherein
R is a monovalent radical selected from the group consisting of hydrogen and 1 to 4 carbon atom alkyl,
R' is a divalent radical selected from the group consisting of alkylene radicals containing 1 to 5 carbon atoms, and
X is a divalent radical selected from the group consisting of —O— and —O(CH$_2$—R'—O)$_n$— wherein $n$ is a positive integer from 1 to 10, and
(c) 0.1 to 5 parts of a polymerization modifying agent,
in between about 150 to 1000 parts of water, said dispersion containing between about 0.01 to 2 parts of a peroxide catalyst per 100 parts of said mixture,
(B) heating the dispersion for a time and temperature sufficient to substantially completely polymerize said mixture between about 35 to 75° C. and 1 to 10 hours to form a cross-linked copolymer having an inherent viscosity between 0.2 and 3,
(C) adding vinyl chloride to the resulting polymer dispersion in an amount of between about 80 to 110 parts of vinyl chloride for each 100 parts of said mixture of Step A,
(D) mixing the vinyl chloride with said polymer dispersion to uniformly distribute it among the individual particles of said dispersion,
(E) polymerizing the vinyl chloride in contact with the dispersed copolymer particles by heating the dispersion between about 35 to 75° C. for between about 8 to 24 hours to form a graft polymer having an inherent viscosity between about 0.4 and 1.5, and
(F) recovering the resulting internally plasticized polymer by coagulating the dispersion.

8. A process as claimed in claim 7 wherein said dispersion formed in Step A is an emulsion.

9. A process as claimed in claim 7 wherein said dispersion formed in Step A is a suspension from which the dispersed particles will settle unless the dispersion is agitated.

10. A process as claimed in claim 7 wherein said monomeric polymerizable material is butyl acrylate.

11. A process as claimed in claim 7 wherein said monomeric polymerizable material is a mixture of 90 parts of butyl acrylate and 10 parts of methyl methacrylate.

12. A process as claimed in claim 7 wherein said cross-linking copolymerizable monomer is diethylene glycol diacrylate.

13. A process as claimed in claim 7 wherein said cross-linking copolymerizable monomer is ethylene glycol dimethacrylate.

14. A process as claimed in claim 7 wherein said peroxide catalyst is potassium persulfate dissolved in the water forming the continuous phase of said dispersion.

15. A process as claimed in claim 7 wherein said peroxide catalyst is benzoyl peroxide contained as a component of the dispersed phase of said dispersion.

16. A process as claimed in claim 7 wherein said polymerization modifying agent is an alkyl mercaptan containing 4 to 30 carbon atoms.

17. A method of forming a flexible internally plasticized vinyl chloride polymer possessing high resistance against extraction and low migration tendency which comprises:
(A) emulsifying a monomer mixture consisting essentially of 98 parts of butylacrylate, 2 parts of ethylene glycol dimethacrylate and 0.3 part of tertiary dodecyl mercaptan in 360 parts of water having dissolved therein 0.2 part of potassium persulfate,
(B) heating the emulsion between about 4 and 5 hours at 50° C. to polymerize at least 95% of said monomer mixture into an emulsified, cross-linked copolymer having an inherent viscosity between 0.2 and 3,
(C) adding 75 parts of vinyl chloride and 0.15 part of potassium persulfate to the resulting copolymer emulsion,
(D) mixing the vinyl chloride with the copolymer emulsion to uniformly distribute it among the individual emulsified particles of the emulsion,
(E) polymerizing the vinyl chloride in contact with the said emulsified copolymer particles for between about 10 to 14 hours at 50° C. to form a graft polymer having an inherent viscosity between about 0.4 and 1.5, and
(F) recovering the resulting internally plasticized vinyl chloride polymer by coagulating the polymer emulsion of Step E.

18. A flexible internally plasticized vinyl chloride graft polymer having an inherent viscosity between 0.4 and 1.5 characterized by good processibility, high resistance against extraction therefrom of material when the polymer is contained with fluids which extract plasticizer from externally plasticized polyvinyl chloride, low migration tendency and a Masland Impact of at least as low as −20° F. consisting essentially of (1) a copolymer of (a) 95 to 99.5 parts ester having the formula:

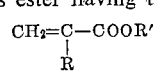

wherein

R is hydrogen or 1 to 4 carbon atom alkyl, and
R' is 2 to 15 atom alkyl, and (b) 0.5 to 5 parts ester having the formula:

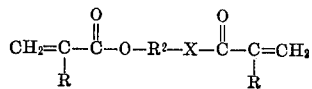

wherein

R is as defined above,
R² is 1 to 5 carbon atom alkylene, and
X is a divalent radical selected from the group consisting of —O— and —O(CH₂—R²—O)ₙ— wherein $n$ is a positive integer from 1 to 10, said copolymer before grafting having an inherent viscosity between 0.2 and 3, said copolymer having grafted thereon, (2) a graft material selected from the group consisting of vinyl chloride and mixtures of vinyl chloride with up to 20% by weight of other copolymerizable monoethylenically unsaturated compound, said graft copolymer consisting of 50 to 200 parts of said graft material for each 100 parts of said copolymer.

19. A flexible internally plasticized vinyl chloride graft polymer having an inherent viscosity between 0.4 and 1.5 and a Masland Impact of at least as low as −20° F. consisting essentially of (1) a copolymer of (a) 95 to 99.5 parts of butyl acrylate and (b) 0.5 to 5 parts ethylene glycol dimethacrylate, said copolymer before grafting having an inherent viscosity between 0.2 and 3, said copolymer having grafted thereon vinyl chloride in an amount between 50 and 200 parts for each 100 parts of said copolymer.

20. A flexible graft polymer as claimed in claim 19 consisting essentially of 56% butyl acrylate, 1% ethylene glycol dimethacrylate and 43% vinyl chloride as expressed in weight percentages to the nearest whole number.

References Cited

UNITED STATES PATENTS

| | | | |
|---|---|---|---|
| 3,019,208 | 1/1962 | Reid et al. | 260—876 |
| 3,041,308 | 6/1962 | Baer | 260—876 |
| 3,041,310 | 6/1962 | Luftglass | 260—876 |
| 3,055,859 | 9/1962 | Vollment | 260—885 |
| 3,222,422 | 12/1965 | Cohen | 260—876 |

OTHER REFERENCES

Shildknecht, Vinyl and Related Polymers (1952), pages 208–210.

SAMUEL H. BLECH, *Primary Examiner.*

MURRAY TILLMAN, *Examiner.*

J. T. GOOLKASIAN, *Assistant Examiner.*

UNITED STATES PATENT OFFICE

CERTIFICATE OF CORRECTION

Patent No. 3,334,156                         August 1, 1967

John W. Calentine et al.

It is hereby certified that error appears in the above numbered patent requiring correction and that the said Letters Patent should read as corrected below.

Column 2, line 56, for "wth" read -- with --; column 5, line 36, for "dially sebacate" read -- diallyl sebacate --; lines 37 and 38, for "1,2-naphitaconate, diallyl fumarate, diallyl oxalate, diallyl sebacate," read -- 1,2-naphthalene dicarboxylates, and mixtures of any of these --; column 10, line 2, for "pentarythritol" read -- pentaerythritol --; column 11, line 38, and column 13, line 3, after "alkyl", each occurrence, insert -- when R is hydrogen and 5 to 18 carbon atom alkyl when R is alkyl --; column 12, line 69, for "contained" read -- contacted --.

Signed and sealed this 25th day of June 1968.

(SEAL)

Attest:

Edward M. Fletcher, Jr.

Attesting Officer

EDWARD J. BRENNER

Commissioner of Patents